Figures 1, 2, 3, 4:
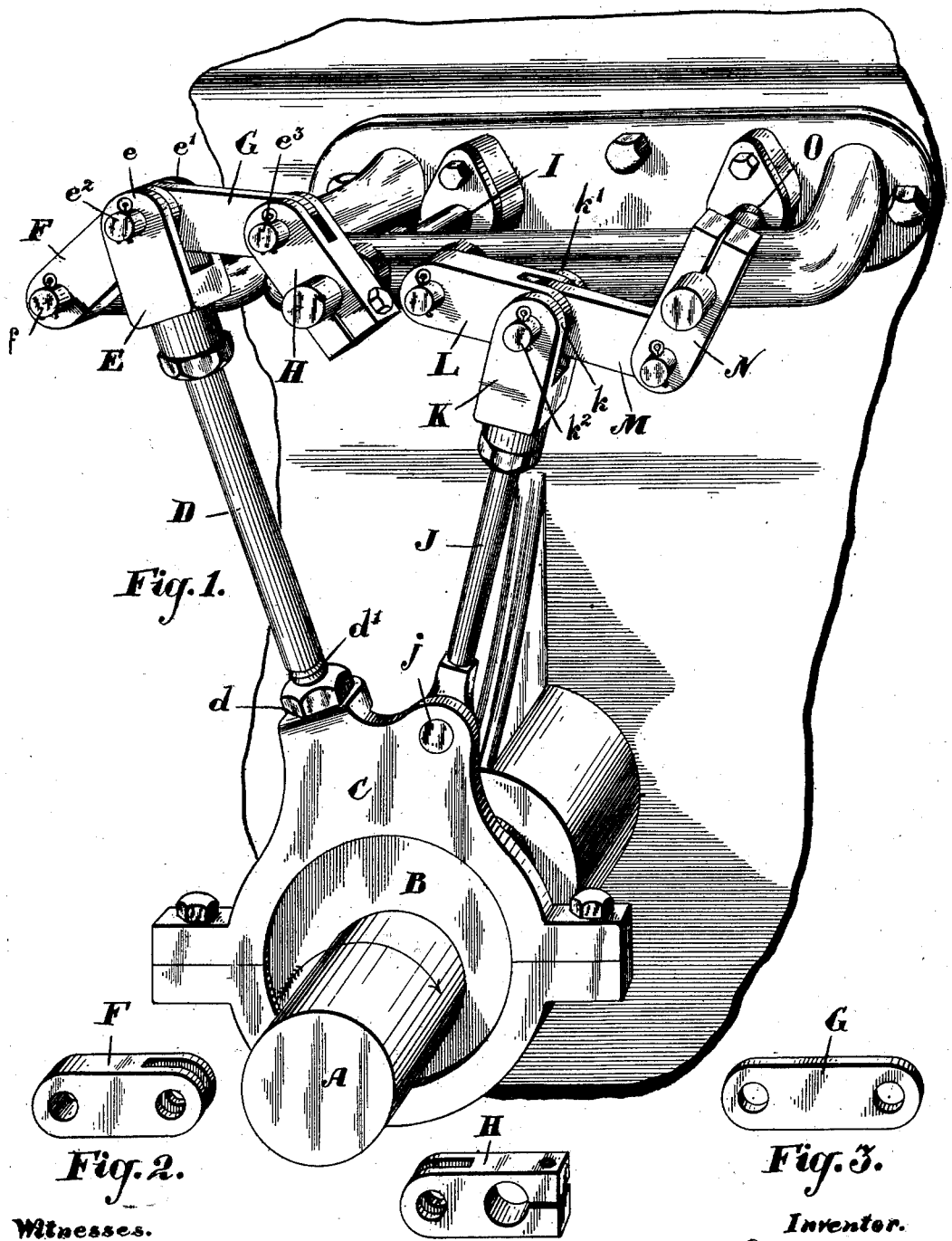

No. 717,038. Patented Dec. 30, 1902.
F. H. SLEEPER.
VALVE GEAR FOR ENGINES.
(Application filed Jan. 15, 1902.)

(No Model.) 2 Sheets—Sheet 1.

Witnesses.
Lloyd Blackmore
Robert Trotter

Inventor.
F. H. Sleeper
by Featherstonhaugh & Co.
Attys.

No. 717,038. Patented Dec. 30, 1902.
F. H. SLEEPER.
VALVE GEAR FOR ENGINES.
(Application filed Jan. 15, 1902.)
(No Model.) 2 Sheets—Sheet 2.
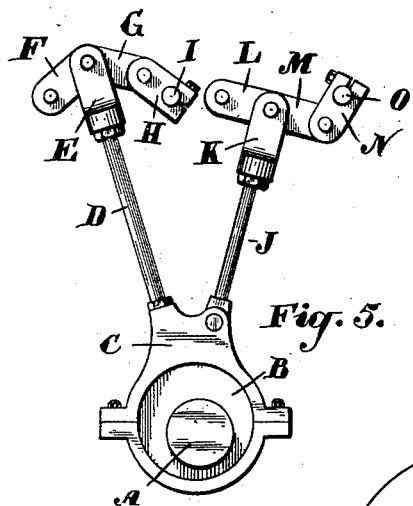
Fig. 5.
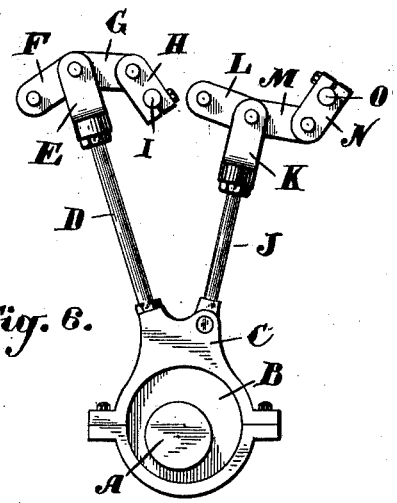
Fig. 6.
Fig. 9.
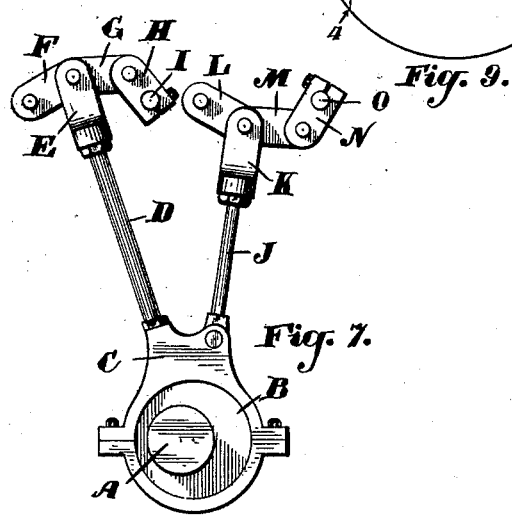
Fig. 7.
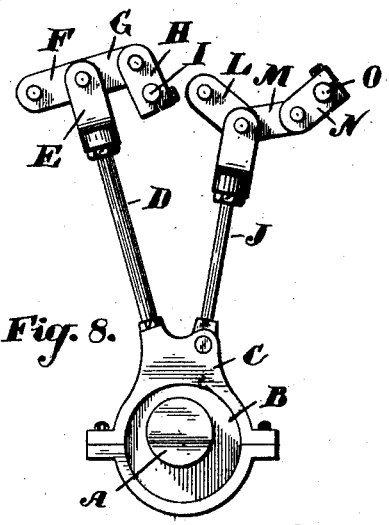
Fig. 8.
Witnesses.
Floyd Blackmore
Robert J. Trotter
Inventor.
F. H. Sleeper
by Fetherstonhaugh & Co,
Atty's.
THE NORRIS PETERS CO., PHOTO-LITHO., WASHINGTON, D. C.

UNITED STATES PATENT OFFICE.

FRANK HENRY SLEEPER, OF WESTMOUNT, CANADA.

VALVE-GEAR FOR ENGINES.

SPECIFICATION forming part of Letters Patent No. 717,038, dated December 30, 1902.

Application filed January 15, 1902. Serial No. 89,891. (No model.)

*To all whom it may concern:*

Be it known that I, FRANK HENRY SLEEPER, a subject of the King of Great Britain, residing at Westmount, in the county of Jacques Cartier, in the Province of Quebec, Canada, have invented certain new and useful Improvements in Valve-Gear for Steam-Engines, of which the following is a specification.

My invention relates to improvements in valve-gear for steam-engines; and the object of the invention is to design a device whereby the action of the valves is quick and positive and the parts readily adjustable and which will obviate the use of the trip-gear and at the same time be absolute and regular in its operation; and it consists, essentially, of double-jointed toggles pivotally attached to the ends of rods, which are connected at their other ends to an eccentric, the said rods and toggles being arranged at such angles as to insure a late release in the operation of the exhaust-valve and a small amount of compression, the various parts being constructed in detail as hereinafter more particularly described.

Figure 1 is a perspective view of my device, showing a portion of the engine-casing and the eccentric mechanism. Fig. 2 is a detail of a toggle. Fig. 3 is a detail of a toggle. Fig. 4 is a detail of a toggle or driver. Fig. 5 is a view of my device, showing the position of toggle-joints when the inlet-valve is open and the exhaust-valve closed. Fig. 6 is a view of my device, showing the position of the toggle-joints with the inlet-valve just closing and the exhaust-valve yet closed. Fig. 7 is a view showing the position of the toggle-joints with the exhaust-valve opening and the inlet-valve closed. Fig. 8 is a view of my device, showing the position of the toggle-joints with both inlet and exhaust valves closed. Fig. 9 is a diagram showing the points of admission and cut off in the inlet-valve and the points of release and compression in the exhaust-valve.

Like letters of reference indicate corresponding parts in each figure.

A is the shaft.

B is a sheave encircling the shaft A and to be herein known as the "eccentric" B.

The eccentric B revolves with the shaft A inside the ring C, and to which it imparts a lateral or vertical movement, according to the manner in which the gear is set on the engine. The eccentric B may be made to shift by an ordinary wheel-governor.

The rod D is attached to the strap C at $d$ and preferably has a threaded end $d'$ and at the other end similarly attached to the forked end E. Between the tines $e$ and $e'$ of the forked end E the toggles F and G swing on the pivot $e^2$. The toggle F is pivotally attached to the casing of the engine or projection therefrom by the pivot $f$. The toggle or driver H is pivotally linked to the toggle G. The valve-stem I is fixedly attached to the toggle H, so that any movement whatever of the toggle or driver H causes a turning motion in the said stem.

J is a rod pivotally attached to the strap C at $j$ and designed to be set, preferably, at an angle of thirty degrees to the rod D. In the rod J the forked end K is similar in construction to the forked end E, and between the tines $k$ and $k'$ the toggles L, M, and N are pivotally arranged and linked, though the position of these toggles is at all times different from that of the toggles at the end of the rod D, thus giving the valve-stem O its quickest turning motion at a different moment to that of the valve-stem I.

The operation of my device will be readily understood from the construction and the accompanying drawings. For instance, it will be seen in Fig. 1 that the toggles F, G, and H are set at an angle, and as the shaft A and eccentric B revolve the strap C in its movement with the eccentric-sheave B draws the toggles F and G to a straight position, at the same time throwing the toggle or driver H substantially at right angles to the toggles F and G. As the toggle or driver H is fixedly attached to the stem I, the latter is made to rotate, and the valve moving therewith is thus thrown open or closed, as the case may be. It will be seen that in this particular movement the inlet-port will be thrown open full by the very sudden turning motion of the stem I when the toggles are thrown to the extreme angle, and the closing will be equally quick on the return movement. The eccentric B in describing its revolution in the direction indicated by the arrow on the shaft A, the toggles F and G, through the agency of the strap C and the rod D, are drawn from the angular position shown in Fig. 1 to a position in which the pivot-pins $f$, $e^2$, and $e^3$ will be substantially in alinement. It is thus shown that by means of having the toggle fixedly attached to the engine-frame at $f$ any movement similar to that just described will throw the toggle or driver H over or away from the rod D, and as the said toggle H is rigidly attached to the stem I the latter receives a turning motion, which is quicker as the angle of the toggles F and G is more acute. Thus a quick and positive action of the valve is secured at a minimum of travel, an early cut off is effected, and the travel of my valve is very short, about five-sixteenths of an inch, as compared with two inches in some other gears, in consequence causing a great saving in friction. This gear also admits of very high speed.

The valve may be opened and closed while the shaft is turning less than ninety degrees.

The operation of the exhaust-valve is similar to that just described, with the exception that the toggles L and M work in exactly the reverse or opposite direction to the toggles F and G and that the rod J is pivotally attached to the strap C to allow for the way incidental to the operation of an eccentric.

The pin $k^2$ is located a distance of about thirty degrees behind the pin $e^2$ in relation to the revolving shaft, which causes the exhaust-valve to reach either end of its travel later correspondingly than the inlet-valve and allow a late release, and in consequence a small amount of compression.

In order to more clearly explain the working of the gear in the various events, the approximate position of the toggle-joints is shown in Figs. 5, 6, 7, and 8 and also the position of the eccentric in relation thereto. To further facilitate the understanding of this device, I have added the diagram Fig. 9, in which it will be seen that the part from 1 to 2 is the arc of admission, 2 to 3 the arc of expansion, 3 to 4 the arc of exhaust, and 4 to 1 the arc of compression, thus plainly, in conjunction with Figs. 5, 6, 7, and 8, emphasizing the events, including the late release and the small amount of compression.

It must be understood that I do not confine myself to attaching the rod to the toggle-joint at any given point, as it may be necessary in some cases to facilitate the working of the device to attach it at or near to one end; but for convenience in illustration and description I have here shown the rod attached at the joint, and, further, it must be mentioned that other means of connecting the toggle-joint to the eccentric herein shown may be adopted, as the essential feature of the invention is the plurality of bars forming toggle-joints. Many ways may be devised for bringing them to an angular position from a straight position, and vice versa, though the construction I have described and illustrated has many advantages and to a more or less degree will form the basis of other constructions.

What I claim as my invention is—

1. In a steam-engine valve-gear, a rocking valve having an oscillating stem provided with a rigid arm, an eccentric and strap, a rod connected thereto, a link connecting the opposite end of the rod with a stationary part of the engine-frame, and a second link connecting said opposite end with the arm on the valve-stem, said links forming a toggle-joint, substantially as described.

2. In a steam-engine valve-gear, the combination with the rocking admission and exhaust slide-valves, of arms carried on the ends of such valves, an eccentric and strap, rods connected at one end to said strap, links connecting the free ends of said rods with a stationary part of the frame, and other links connecting said ends of the rods with the arms on the valve-stems, substantially as described.

3. In an engine, the combination with the inlet and exhaust valves and valve-stems therefor, of a single eccentric and strap, a plurality of rods adjustably attached at suitable angles to the eccentric-ring, a plurality of toggles suitably connected to the valve-stems and pivotally connected to the engine-frame, and to the ends of the rods, as and for the purpose specified.

4. In an engine, the combination with the inlet and exhaust valves and stems therefor, and eccentric, of a rod adjustably attached to the eccentric-strap, a rod pivotally connected to the said eccentric-strap at a suitable angle to the aforesaid rod, a plurality of toggle-joints pivotally secured to the said rods and to the frame, and a plurality of drivers suitably connected to the valve-stems and the toggle-joints, as and for the purpose specified.

5. In combination, the rocking admission and exhaust slide-valves having rigid arms on the oscillating stems thereof, a single eccentric and strap, a rod rigidly carried by said eccentric, a link connecting the opposite end of said rod with a stationary part of the engine-frame, a second link connecting said end with the arm on the admission-valve stem, a second rod pivotally connected to said strap and disposed at an angle to said first-named rod, a link connecting said second rod with a stationary part of the frame, and a second link connecting said second rod with the arm on the exhaust-valve stem, substantially as described.

Signed at Montreal this 24th day of December, 1901.

FRANK HENRY SLEEPER.

Witnesses:
LLOYD BLACKMORE,
ROBERT T. TROTTER.